(12) United States Patent
Choo

(10) Patent No.: US 12,313,934 B2
(45) Date of Patent: May 27, 2025

(54) BACKLIGHT UNIT HAVING A REAR PLATE THAT INCLUDES A SECOND BEAD DISPOSED BETWEEN A SUBSTRATE SEATING UNIT AND A FIRST BEAD

(71) Applicant: LG ELECTRONICS INC., Seoul (KR)

(72) Inventor: Hyunseok Choo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/625,715

(22) Filed: Apr. 3, 2024

(65) Prior Publication Data
US 2025/0130459 A1 Apr. 24, 2025

(30) Foreign Application Priority Data
Oct. 19, 2023 (KR) .................. 10-2023-0140571

(51) Int. Cl.
*G02F 1/1335* (2006.01)
*G02F 1/1333* (2006.01)
(Continued)

(52) U.S. Cl.
CPC .. *G02F 1/133603* (2013.01); *G02F 1/133605* (2013.01); *G02F 1/133606* (2013.01); *G02F 1/133608* (2013.01); *G02F 1/1339* (2013.01)

(58) Field of Classification Search
CPC ......... G02F 1/133603; G02F 1/133605; G02F 1/133606; G02F 1/133608; G02F 1/1339
See application file for complete search history.

(56) References Cited

U.S. PATENT DOCUMENTS

2010/0165240 A1* 7/2010 Cho .................. G02F 1/133603
349/61
2012/0105763 A1* 5/2012 Takeuchi .......... G02F 1/133615
362/249.02
(Continued)

FOREIGN PATENT DOCUMENTS

KR 10-2016-0128799 11/2016
KR 10-2020-0047836 5/2020
(Continued)

OTHER PUBLICATIONS

European Patent Office Application Serial No. 24161909.7, Search Report dated Sep. 11, 2024, 8 pages.
(Continued)

*Primary Examiner* — Tracie Y Green
(74) *Attorney, Agent, or Firm* — LEE, HONG, DEGERMAN, KANG & WAIMEY

(57) ABSTRACT

A backlight unit capable of reducing production costs while securing rigidity, and a display including the same are disclosed. The backlight unit includes: a backlight substrate including a plurality of first substrates that is spaced apart from each other by a predetermined distance in a first direction and extends in a second direction perpendicular to the first direction, and a second substrate through which the plurality of first substrates is connected to each other; a plurality of light emitting diodes (LEDs) arranged at predetermined intervals on a front surface of the backlight substrate; a rear plate including a substrate seating unit on which a rear surface of the backlight substrate is seated, and at least one first bead that protrudes forward while being disposed between the first substrates; a reflector disposed on a front surface of the backlight substrate; and an adhesive tape disposed between the backlight substrate and the reflector
(Continued)

and configured to attach the backlight substrate and the first bead of the rear plate to the reflector.

14 Claims, 11 Drawing Sheets

(51) Int. Cl.
  *G02F 1/13357* (2006.01)
  *G02F 1/1339* (2006.01)

(56) References Cited

U.S. PATENT DOCUMENTS

| | | | |
|---|---|---|---|
| 2016/0238895 A1* | 8/2016 | Choi | G02F 1/133605 |
| 2017/0351145 A1 | 12/2017 | Isono et al. | |
| 2023/0004046 A1* | 1/2023 | Kim | G02F 1/133382 |
| 2024/0319535 A1* | 9/2024 | Kim | G02F 1/133603 |

FOREIGN PATENT DOCUMENTS

| | | |
|---|---|---|
| KR | 10-2023-0003942 | 1/2023 |
| KR | 1020230025085 | 2/2023 |

OTHER PUBLICATIONS

Korean Intellectual Property Office Application No. 10-2023-0140571, Office Action dated Nov. 21, 2024, 7 pages.

* cited by examiner (a)

(b)

BACKLIGHT UNIT HAVING A REAR PLATE THAT INCLUDES A SECOND BEAD DISPOSED BETWEEN A SUBSTRATE SEATING UNIT AND A FIRST BEAD

CROSS-REFERENCE TO RELATED APPLICATION(S)

Pursuant to 35 U.S.C. § 119, this application claims the benefit of earlier filing date and right of priority to Korean Application No(s). 10-2023-0140571, filed on Oct. 19, 2023, the contents of which are all incorporated by reference herein in its entirety.

BACKGROUND OF THE DISCLOSURE

Field of the Disclosure

The present disclosure relates to a backlight unit capable of reducing production costs while securing rigidity, and a display including the same.

Discussion of the Related Art

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

Recently, self-emissive materials, such as an Organic Light-Emitting Diode (OLED), that do not use a backlight installed at a rear surface of a display enable implementation of a curved display panel.

In order to reduce production costs of the display and at the same time reduce a total weight of the display, research has been actively conducted to implement an improved display with a minimum number of available members while omitting unnecessary members from the display.

SUMMARY OF THE DISCLOSURE

Accordingly, embodiments of the present disclosure are directed to a backlight unit and a display that substantially obviate one or more problems due to limitations and disadvantages of the related art.

An object of the present disclosure is to provide a backlight unit capable of reducing production costs and securing rigidity, and a display including the same.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a backlight unit may include: a backlight substrate including a plurality of first substrates that is spaced apart from each other by a predetermined distance in a first direction and extends in a second direction perpendicular to the first direction, and a second substrate through which the plurality of first substrates is connected to each other; a plurality of light emitting diodes (LEDs) arranged at predetermined intervals on a front surface of the backlight substrate; a rear plate including a substrate seating unit on which a rear surface of the backlight substrate is seated, and at least one first bead that protrudes forward while being disposed between the first substrates; a reflector disposed on a front surface of the backlight substrate; and an adhesive tape disposed between the backlight substrate and the reflector and configured to attach the backlight substrate and the first bead of the rear plate to the reflector.

Each of the adhesive tape and the reflector may include at least one light source hole formed at a position corresponding to the light emitting diode (LED).

A height difference between the first bead and the substrate seating unit of the rear plate may correspond to a height of the backlight substrate.

The backlight unit may further include: a second bead disposed between the substrate seating unit and the first bead, and configured to protrude farther backward than the substrate seating unit.

A spacing between the first substrates may correspond to a length of the first substrate in the first direction; and the second substrate may be located at one end of the first substrate in the second direction.

A diffuser plate supporter may be disposed between the first substrates and may be fastened to the rear plate.

The diffuser plate supporter may be coupled to a fastening hole formed in the first bead.

The diffuser plate supporter may include: a support protrusion formed to protrude forward; a supporter hook formed to extend toward a rear surface of the support protrusion and inserted into the fastening hole of the first bead; and an elastic portion formed to extend in a lateral direction of the support protrusion so that an end portion of the elastic portion is in contact with a top surface of the reflector.

The supporter hook may include an end portion that is bent toward one side from among the second direction and a third direction opposite to the second direction; and the rear plate includes a fixing hole that is adjacent to the fastening hole and into which an end portion of the supporter hook is inserted.

The elastic portion may include one pair of elastic portions in which one elastic portion extends from the support protrusion in the second direction and the other elastic portion extends from the support protrusion in the third direction; and a length of the elastic portion in one direction in which the end of the supporter hook is bent may be longer than a length of the elastic portion in an opposite direction of the one direction.

Each of the adhesive tape and the reflector may include a supporter hole formed at a position corresponding to the fastening hole.

In accordance with another aspect of the present disclosure, a display device may include a liquid crystal panel; an optical sheet layer disposed on a rear surface of the liquid crystal panel; and a backlight unit disposed on a rear surface of the optical sheet layer, wherein the backlight unit includes a backlight unit may include: a backlight substrate including a plurality of first substrates that is spaced apart from each other by a predetermined distance in a first direction and extends in a second direction perpendicular to the first direction, and a second substrate through which the plurality of first substrates is connected to each other; a plurality of light emitting diodes (LEDs) disposed at predetermined intervals on front surfaces of the first and second substrates; a rear plate including a substrate seating unit on which a rear surface of the backlight substrate is seated, and at least one first bead that protrudes forward while being disposed between the first substrates; a reflector disposed on a front surface of the backlight substrate; and an adhesive tape disposed between the backlight substrate and the reflector and configured to attach the backlight substrate and the first bead of the rear plate to the reflector.

A height difference between the first bead and the substrate seating unit of the rear plate may correspond to a height of the backlight substrate.

The display device may further include: a diffuser plate supporter disposed between the first substrates and fastened to a fastening hole formed in the first bead of the rear plate.

The diffuser plate supporter may include: a support protrusion formed to protrude forward; a supporter hook formed to extend toward a rear surface of the support protrusion and inserted into the fastening hole of the first bead; and an elastic portion formed to extend in a lateral direction of the support protrusion so that an end portion of the elastic portion is in contact with a top surface of the reflector.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
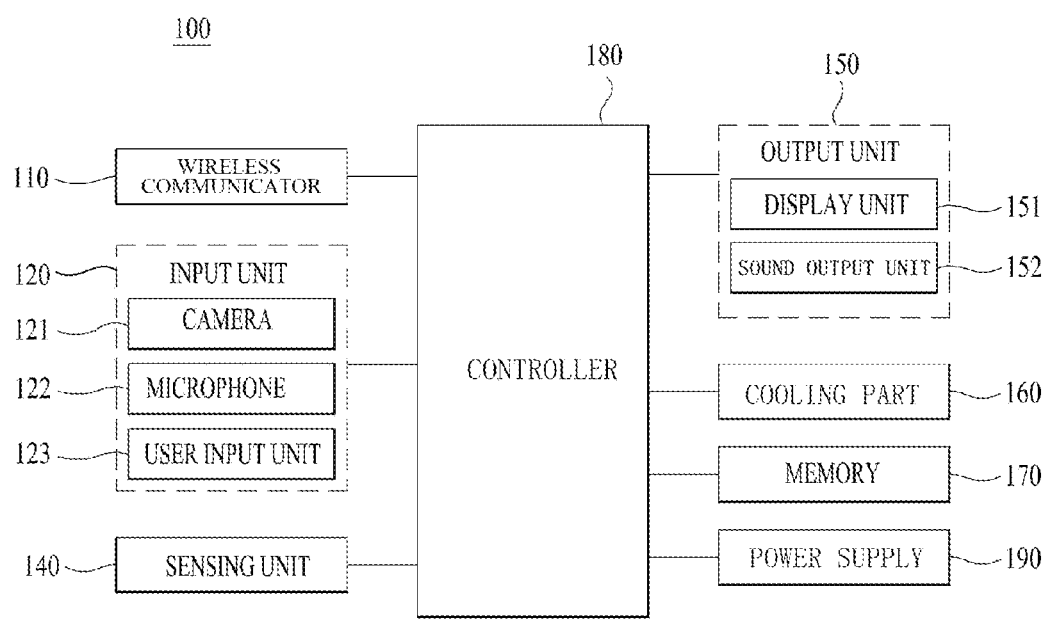
FIG. 1 is a block diagram illustrating components of a display device according to the present disclosure.

FIG. 1 is a block diagram illustrating components of a display device 100.

Referring to FIG. 1, the display device 1000 may include a wireless communication unit 110, an input unit 120, a sensing unit 140, an output unit 150, a cooling unit 160, a memory 170, a controller 180, a power-supply unit 190, and the like. The constituent components shown in FIG. 1 are not always required to implement the display device 100, such that it should be noted that the display device 100 according to the present disclosure may include more or fewer components than the elements listed above.

More specifically, among the above-described constituent components, the wireless communication unit 110 may include at least one module for implementing any one of wireless communication between the display device 100 and a wireless communication system, wireless communication between the display device 100 and another display device, and wireless communication between the display device 100 and an external server. In addition, the wireless communication unit 110 may include one or more modules that enable wireless communication between the devices. Additionally, the wireless communication unit 110 may include one or more modules that connect the display device 100 to one or more networks.

The wireless communication unit 110 may include at least one of a mobile communication module, a wireless Internet module, and a short-range communication module.

The input unit 120 may include a camera 121 or an image input unit for receiving image signals, a microphone 122 or an audio input unit for receiving audio signals, and a user input unit 123 (e.g., a touch key, a mechanical key, etc.) for receiving information from the user. Voice data or image data collected by the input unit 120 may be analyzed so that the analyzed result can be processed as a control command of the user as necessary.

With a decrease in size of a bezel of the display device 100, many display devices 100 have been configured such that the number of physical button type input units 120 exposed to the outside is minimized in recent years. Instead, a minimum number of physical buttons is located at the rear surface or the side surface of the display device, and the display device may receive user input through the touchpad or the user input interface unit, a description of which will follow, using a remote controller.

The sensing unit 140 is a device configured to sense change inside or outside the display device 100. For example, the sensing unit 120 may include at least one of a proximity sensor, an illumination sensor, a touch sensor, an infrared (IR) sensor, an ultrasonic sensor, an optical sensor (e.g. a camera), an audio sensor (e.g. a microphone), a battery gauge, and an environmental sensor (e.g. a hygrometer or a thermometer). On the other hand, the display device 100 disclosed in the present disclosure may combine various kinds of information sensed by at least two of the above-described sensors and may use the combined information.

The controller 180 may check the state of the display device 100 based on information collected by the sensing unit 140, and when a problem occurs, may inform a user of the same or may solve the problem, whereby the controller may perform control such that the display device is maintained in the best state.

The output unit 150 may generate output signals related to visual, auditory, tactile sensation, or the like. The output unit 150 may include at least one of a display unit 151 and an audio output unit 152. The display 200 may construct a mutual layer structure along with a touch sensor, or may be formed integrally with the touch sensor, such that the display 200 can be implemented as a touchscreen. The touchscreen may serve as a user input unit 123 that provides an input interface to be used between the display device 100 and the user, and at the same time may provide an output interface to be used between the display device 100 and the user.

A plasma display panel (PDP), a liquid crystal display (LCD), an organic light-emitting diode (OLED), or a flexible display may be used as the display module 200, and a 3D display may also be used. The 3D display 130 may be classified as a non-glasses type display or a glasses type display.

Meanwhile, the display module 200 may be constituted by a touchscreen, whereby an input device may also be used in addition to an output device.

Figure 2:
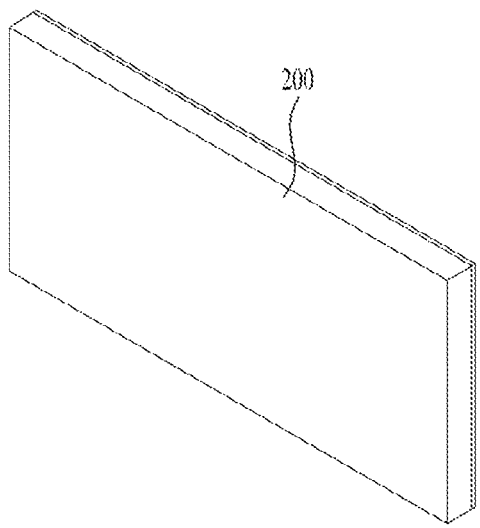
FIG. 2 is a perspective view illustrating an example of the display device according to the present disclosure.
Figure 2:
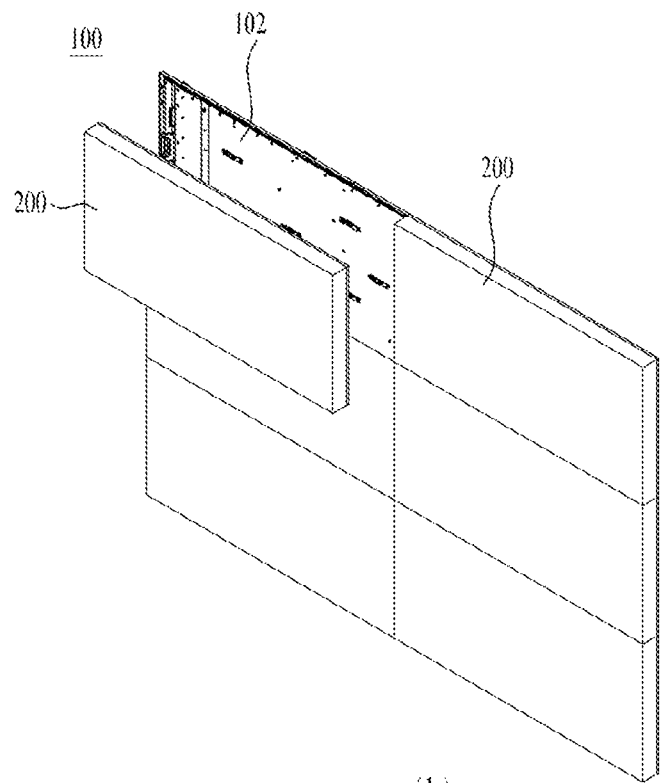

Referring to FIG. 2, the display device 100 according to the present disclosure may implement a large screen display 200 by arranging a plurality of displays 200 in a grid shape.

The cooling unit 160 may refer to a component configured to dissipate internal heat of the display device 100, and may include all of heat pipes, cooling fins, circulation fans that promote internal air circulation, vent holes, etc.

The display device 100 installed for the purpose of exhibition/advertisement may be driven for a long time and may output images with high illuminance so that it can be easily seen from the outside. Therefore, heat generated by the display 151 and the controller 180 may affect each component of the display device 100, cause a malfunction, so that a heat dissipation structure for discharging internal heat is very important to prevent such malfunction.

In the display device 100, heat dissipation may be implemented in various ways. In the heat dissipation process, depending on the object upon which heat transfer is to be performed, heat dissipation methods can be divided into an air-cooling method and a water-cooling method. In the air-cooling method, heat dissipation efficiency may be increased by maximizing a surface area using heat dissipation fins, etc. In the water-cooling method, heat dissipation efficiency may be increased by guiding a path and sealing of heat transfer materials using structures such as heat pipes or the like.

The above-described heat dissipation cooling methods may be used independently of each other, or two or more heat dissipation cooling methods may also be used in combination as needed.

In addition, the memory 170 may store data supporting various functions of the display device 100. The memory 170 may store data needed to support various functions of the display device 100. The memory 170 may store a plurality of application programs (or applications) executed in the display device 100, and data or instructions required to operate the display device 100. At least some of the application programs may be downloaded from an external server through wireless communication. For basic functions (e.g., an incoming call, an outgoing call, reception of a message, sending of a message, etc.) of the display device 100, at least some of the application programs may be pre-installed in the display device 100 at a stage of manufacturing the product. Meanwhile, the application programs may be stored in the memory 170, and may be installed in the display device 100, so that the application programs can enable the display device 100 to perform necessary operations (or functions).

In addition to the operation related to the application programs, the controller 180 may control overall operation of the display device 100. The controller 180 may process signals, data, and information that are input or output through the above-described constituent components, or may drive the application programs stored in the memory 170, so that the controller 180 can provide the user with appropriate information or functions or can process the appropriate information or functions.

In order to drive the application programs stored in the memory 170, the controller 180 can control at least some of the components shown in FIG. 1. Moreover, in order to drive the application programs, the controller 180 may combine at least two of the components included in the display device 100, and may operate the combination of the components.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

An image signal processed by the controller 180 may be input to the display module 150, which may display an image corresponding to the image signal. In addition, the image signal processed by the controller 180 may be input to an external output device through the external device interface unit 171.

An audio signal processed by the controller 180 may be output through the audio output unit 152. In addition, the audio signal processed by the controller 180 may be input to an external output device through the external device interface unit.

In addition, the controller 180 may control the display device 100 according to a user command input through the user input interface unit 173 or an internal program. Meanwhile, the controller 180 may control the display module 150 to display an image. At this time, the image displayed on the display module 150 may be a still image or video, or may be a 2D image or a 3D image.

Meanwhile, the controller 180 may perform control such that a predetermined 2D object is displayed in an image displayed on the display module 150. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

The power supply unit 190 may supply power to the components of the display device 100. In particular, the power supply unit may supply power to the controller 180, which may be implemented in the form of a system on chip (SOC), the display module 150 for image display, and the audio output unit 152 for audio output.

Specifically, the power supply unit 190 may include an AC/DC converter (not shown) configured to convert AC power into DC power and a DC/DC converter (not shown) configured to convert the level of the DC power.

Meanwhile, the power supply unit 190 serves to distribute power supplied from the outside to the respective components of the display device. The power supply unit 190 may be directly connected to an external power supply in order to supply AC power, or may include a battery so as to be used by charging.

At least some of the components may operate in cooperation with each other to implement an operation, control, or control method of the display device 100 according to various embodiments described below. In addition, the operation, control, or control method of the display device 100 may be implemented on the display device 100 by driving at least one application program stored in the memory 170.

That is, if necessary, two or more components may be combined into one component, or one component may be subdivided into two or more components. In addition, the functions performed in each block are intended to explain the embodiment of the present disclosure, and the specific operation or device does not limit the scope of the present disclosure.

FIG. 2 is a perspective view illustrating a display device 100 according to an embodiment of the present disclosure.

The display device 100 according to the present disclosure may be entirely comprised of one module as shown in FIG. 2(a), and a plurality of displays 200 may be arranged in a grid shape on a bottom cover 102 as shown in FIG. 2(b), resulting in implementation of a large screen.

The display 200 may have a rectangular shape, and may be horizontally long, but another display 200 may also be rotatable or vertically long. Hereinafter, for convenience of explanation, the following description will be given based on a display device that is long in the horizontal direction, but the present disclosure is not limited thereto.

Figure 3:
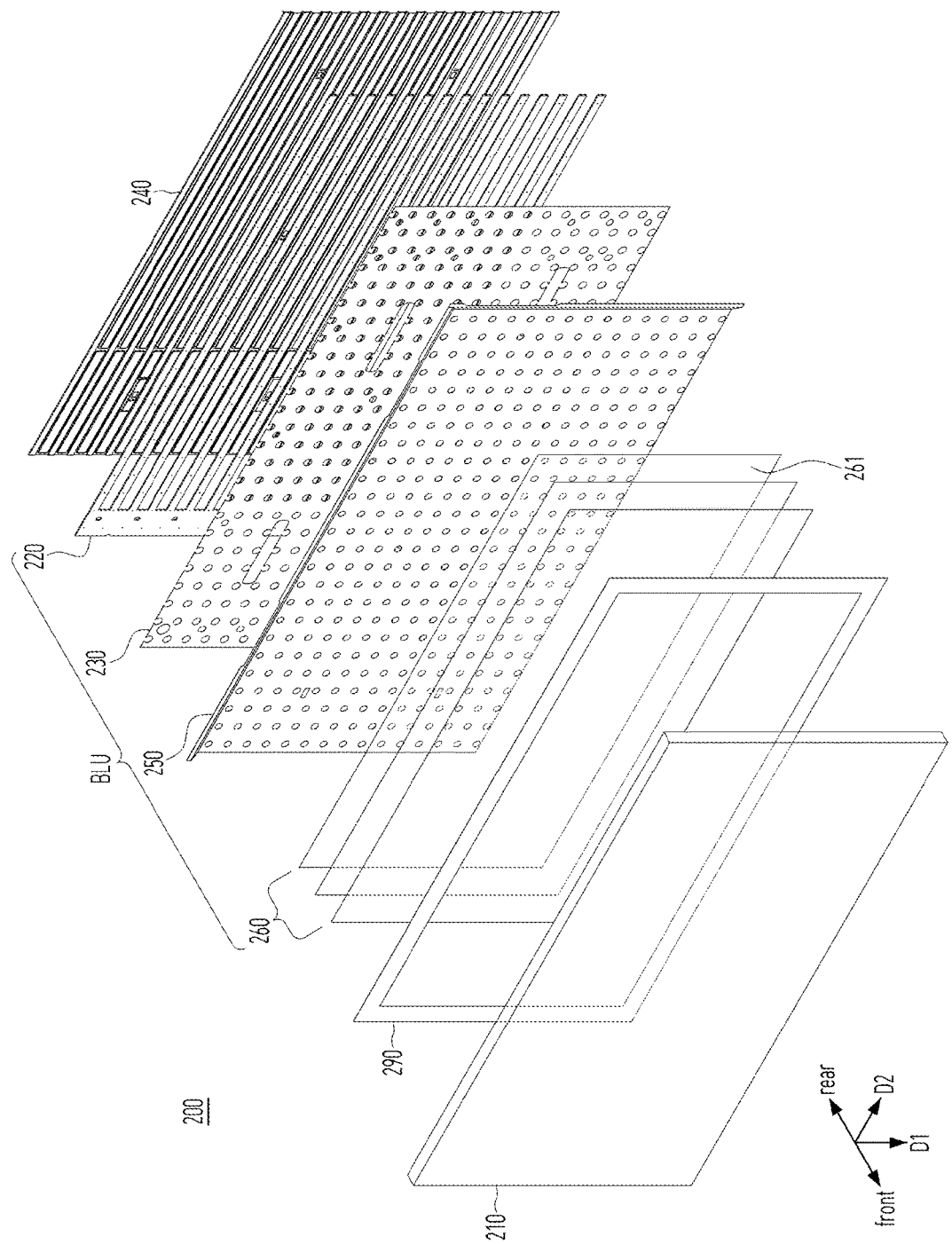
FIG. 3 is an exploded perspective view illustrating the example of the display device according to the present disclosure.

FIG. 3 is an exploded perspective view illustrating the display 200 according to an embodiment of the present disclosure.

Referring to FIG. 2, since the display 200 uses a thin substrate or a sheet material, the display 200 may be bent or damaged. The display 200 may include a rear plate 240. The rear plate 240 may support a back surface of the display, and may obtain a heat dissipation effect. The rear plate 240 may be made of a metal material, and the rear plate 240 according to the present disclosure may include beads protruding toward the front surface or the rear surface.

The display 200 according to the present disclosure may include a backlight unit (BLU) for providing light and a display panel 210 for outputting image information by adding color to the light supplied from the backlight unit (BLU). The display panel 210 may include a liquid crystal panel for selectively transmitting light, and a color filter for implementing color may be disposed on the liquid crystal panel.

A guide panel 290 may be used to align the positions of the backlight unit (BLU) and the display panel 210. The guide panel 290 may have a frame shape like a picture frame. A display panel 210 may be mounted on the front surface of the display, and the backlight unit (BLU) may be seated on the rear surface of the display.

The backlight unit (BLU) may include a backlight substrate 220 on which light emitting diodes (LEDs) 227 for emitting light are mounted; a reflector 250 located in front of the backlight substrate 220; and an optical sheet layer 260 including a diffuser plate 261, which is located in front of the reflector 250.

A plurality of light emitting diodes (LEDs) 227 may be arranged in a grid shape on the backlight substrate 220. The backlight substrate 220 may receive power, may apply the received power to each LED 227, and may emit light toward the display panel 210 located on the front surface of the display 200.

A silicon lens 226 may be provided so that light emitted from the LEDs 227 spreads over a predetermined range. The silicone lens 226 may include a light transmissive material, and may include a diffusion agent to increase a diffusion effect. The silicon lens 226 may cover the LEDs 227 and may be located in a predetermined region around the LEDs 227.

Figure 4:
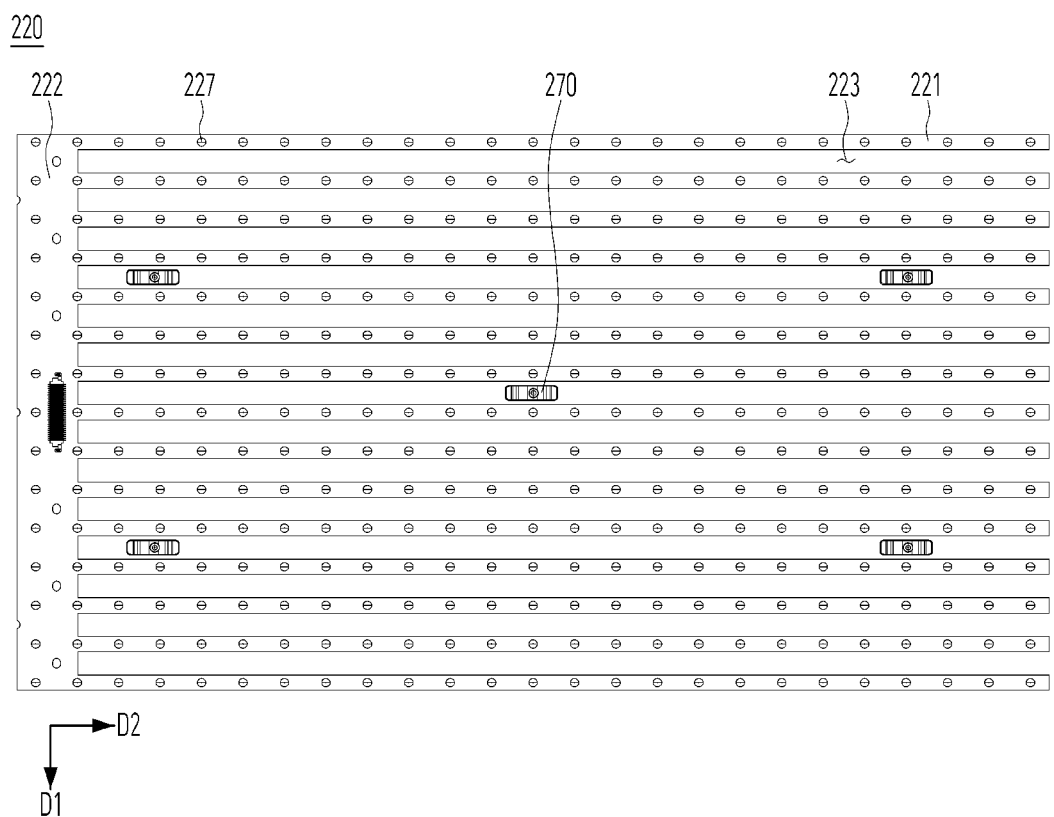
FIG. 4 is a plan view illustrating a backlight substrate of a backlight unit according to an embodiment of the present disclosure.

FIG. 4 is a plan view illustrating the backlight substrate 220 of the backlight unit (BLU) according to an embodiment of the present disclosure. Instead of a solid rectangular plate, the backlight substrate 220 according to the present disclosure may include a plurality of first substrates 221 that is arranged side by side and spaced apart from each other in the first direction D1 and extends in the second direction D2.

The plurality of first substrates 221 may be spaced apart from each other by a predetermined distance in the first direction D1, and the size of the spaced space 223 in the second direction D2 may be equal to or greater than the width of the second direction D2 of the first substrate 221. One side of the first substrate 221 may include a second substrate 222 through which the first substrates 221 are connected to each other, and the backlight substrate 220 may be formed in a fork shape.

The first substrate 221 of the backlight substrate 220 may not necessarily have a straight shape but may have a zigzag shape. As shown in FIG. 4, the second direction D2 may be a long-side direction or a short-side direction.

Figure 5:
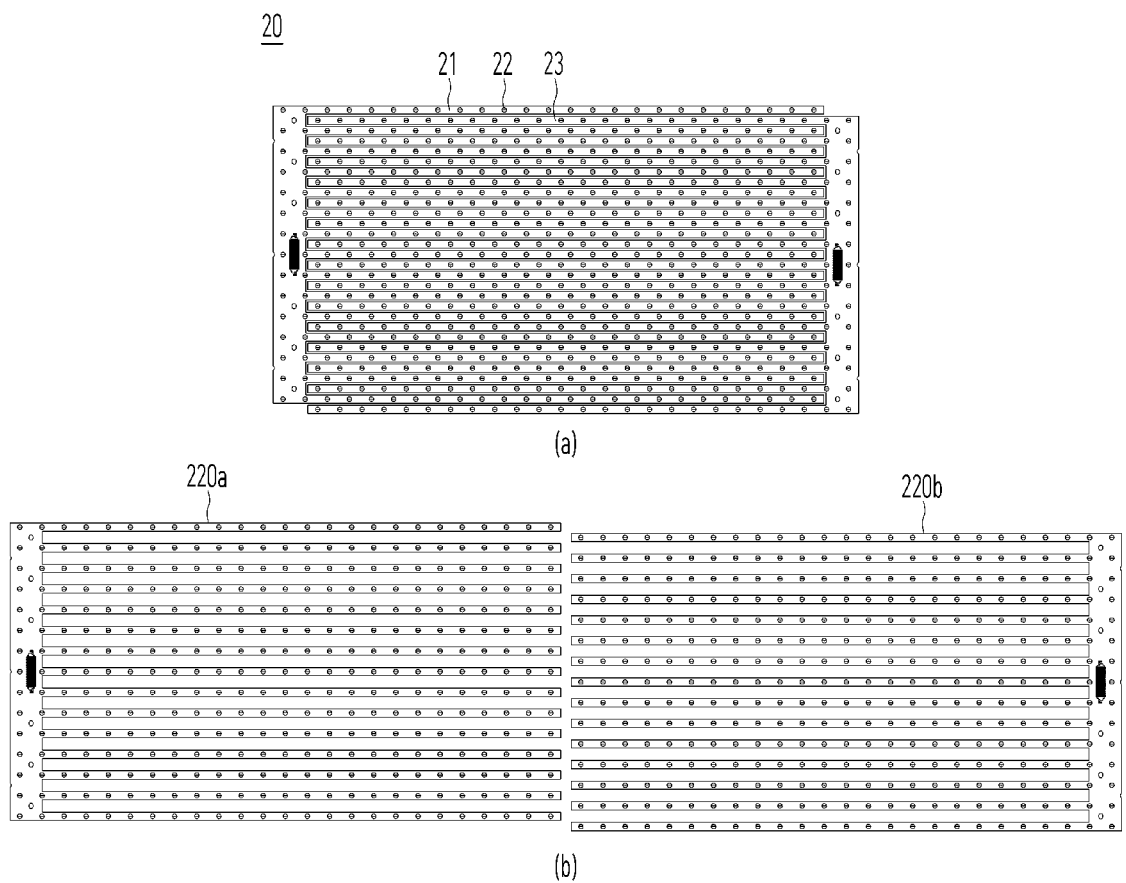
FIG. 5 is a diagram illustrating a method of manufacturing the backlight substrate according to an embodiment of the present disclosure.

FIG. 5 is a diagram illustrating a method of manufacturing the backlight substrate 220 according to an embodiment of the present disclosure. As shown in FIG. 5(a), a solid plate-shaped substrate may be cut to form two fork-shaped backlight substrates 220 as shown in FIG. 5(b). Two backlight substrates 220 may be formed by cutting a solid plate-shaped substrate into a serpentine shape.

The fork-type backlight substrate 220 according to the present disclosure may be implemented using about half the area of a solid-type substrate, so that the production costs and the weight of a product can be reduced.

Components such as a connector of the LEDs 227 or the like are mounted on the substrate using the SMT (Surface Mounter Technology) method in a solid state as shown in FIG. 5(a), and are then cut to form two fork-type substrates as shown in FIG. 5(b).

A diffuser plate 261 is required to convert light from the LEDs 227 each serving as a point light source, into a surface light source. The diffuser plate 261 may diffusely reflect light to provide light having uniform brightness to the display panel 210. In order to sufficiently diffuse light from the diffuser plate 261, the optical sheet layer 260 may be spaced apart from the LEDs 227 by a predetermined distance.

The optical sheet layer 260 as well as the diffuser plate 261 may be made of a plurality of thin and transparent materials, and the guide panel 290 may guide the optical sheet layer 260, the reflector 250, and the backlight substrate 220 to be aligned at correct positions. A diffuser plate supporter 270 may be provided to maintain a distance between the optical sheet layer 260 and the LEDs 227.

The diffuser plate supporters 270 may support the optical sheet layer 260 to maintain a distance between the optical sheet layer 260 and the LEDs 227. The diffuser plate supporters 270 may be disposed at positions where the LEDs 227 are not formed and may be spaced apart from each other by a predetermined distance.

Referring to FIG. 4, the backlight unit (BLU) according to the present disclosure may be configured such that diffuser plate supporters 270 can be arranged using the space between the first substrates 221 of the fork-type backlight substrate 220. The backlight unit (BLU) according to this embodiment may include five diffuser plate supporters 270, without being limited thereto.

The diffuser plate supporters 270 may be fixed to the rear plate 240, which will be described later, and may press the reflector 250 located in front of the backlight substrate 220, thereby increasing the fastening force between the reflector 250, the backlight substrate 220, and the rear plate 240.

When light provided from the LEDs 227 is reflected by the optical sheet layer 260 or the display panel 210 and is not emitted in the front direction, light may be lost. Since luminance of the display device 100 decreases when light is lost, a reflector 250 may be further provided so that all light beams emitted from the LEDs 227 may be directed in the forward direction.

Figure 6:
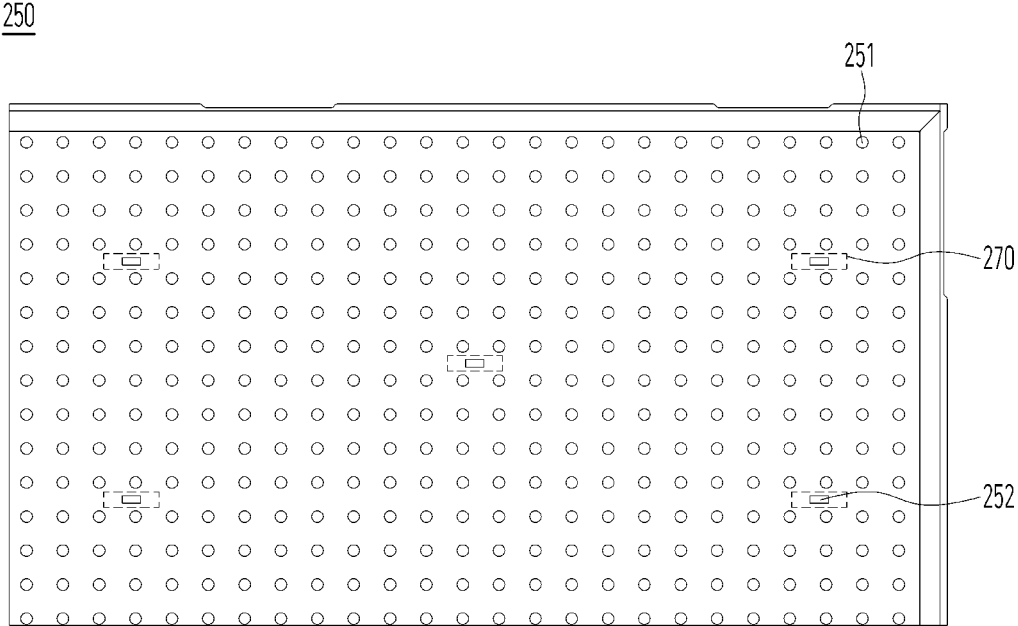
FIG. 6 is a plan view illustrating a reflector of the backlight unit according to an embodiment of the present disclosure.

FIG. 6 is a plan view illustrating the reflector 250 of the backlight unit (BLU) according to an embodiment of the present disclosure. The reflector 250 may include light source holes 251 that expose the LEDs 227 formed on the backlight substrate 220, and the remaining areas other than the light source holes 251 may have a surface with high reflectivity.

The end of the reflector 250 may include an inclined surface extended by a predetermined distance corresponding to the distance from the optical sheet layer 260. The end of the reflector 250 may be seated on the rear surface of the guide panel 290 together with the optical sheet layer 260.

The reflector 250 may be coupled to the front surface of the backlight substrate 220, and may be provided with an adhesive tape 230 located on the front of the backlight substrate 220 to interconnect the backlight substrate 220 and the reflector 250.

Figure 7:
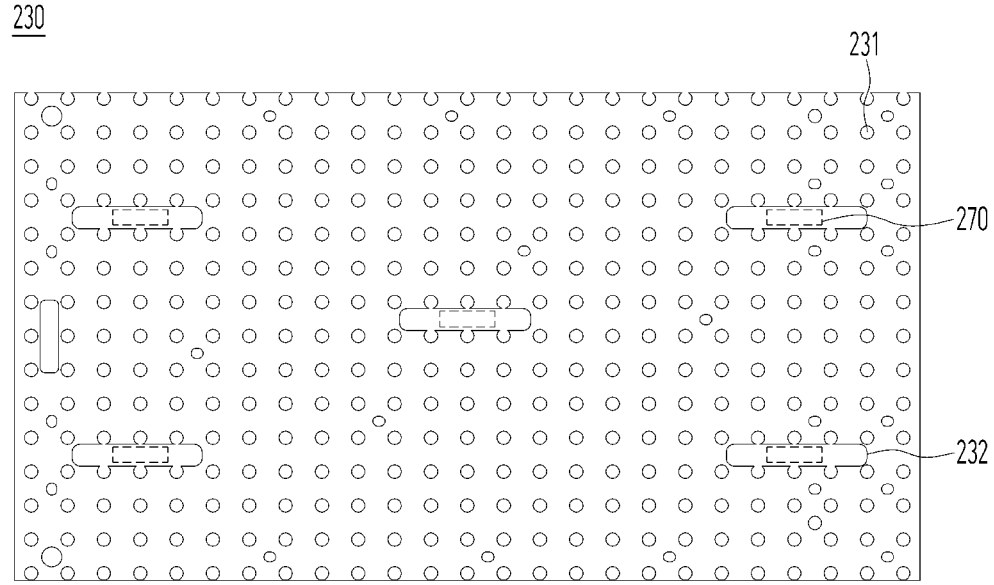
FIG. 7 is a plan view illustrating an adhesive tape of the backlight unit according to an embodiment of the present disclosure.

FIG. 7 is a plan view illustrating the adhesive tape 230 of the backlight unit (BLU) according to an embodiment of the present disclosure. The adhesive tape 230 may include light source holes 231 formed at positions corresponding to the LEDs 227 so that the LEDs 227 can be exposed through the light source holes 251 of the reflector 250.

The light source holes 231 of the adhesive tape 230 may be formed to be larger than the light source holes 251 of the reflector 250 so that the adhesive tape 230 is not exposed through the light source holes 251 of the reflector 250 or does not overlap the LEDs 227.

The adhesive tape 230 is not cut into a fork shape in the same manner as in the backlight substrate 220. The adhesive tape 230 may be disposed between the front surface of the first substrate 221 and the front surface of the second substrate 222 of the backlight substrate 220, and may also be disposed between the plurality of first substrates 221.

The adhesive tape 230 may be attached to the front surface of the rear plate 240 exposed to the space between the first substrates 221 while coupling the reflector 250 to the backlight substrate 220, so that the adhesive tape 230 may couple the rear plate 240 to the reflector 250.

Figure 8:
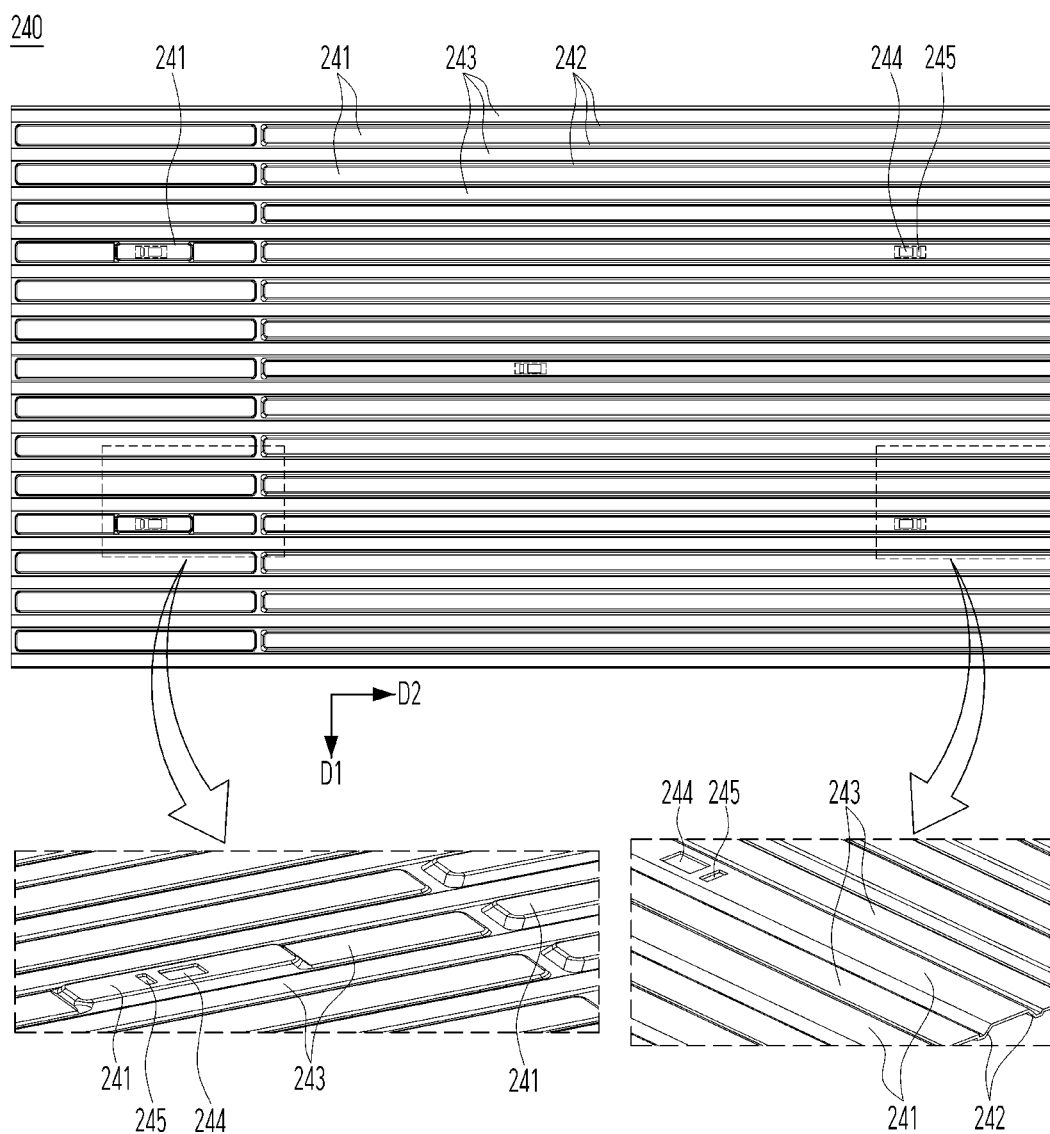
FIG. 8 is a plan view illustrating a rear plate of the backlight unit according to an embodiment of the present disclosure.

However, since the rear plate 240 is spaced apart from the adhesive tape 230 by a thickness of the first substrate 221, the rear plate 240 according to the present disclosure may include first beads 241 that are formed to protrude forward in correspondence with the space 223 between the first substrates 221. FIG. 8 is a plan view illustrating the rear plate 240 of the backlight unit (BLU) according to an embodiment of the present disclosure.

The rear plate 240 is a structure that supports the backlight substrate 220 and simultaneously discharges heat generated from the plurality of LEDs 227 mounted on the backlight substrate 220, and is made of a metal material for rigidity and heat dissipation efficiency. In the case of a wall-mounted display device 100, a back surface of which is not exposed to the outside, the rear plate 240 may form the rearmost surface structure of the display device 100.

The rear plate 240 according to the present disclosure may include the substrate seating unit 243 on which the backlight substrate 220 is seated, and a plurality of first beads 241 protruding forward in the empty space between the first substrates 221. The first beads 241 may be formed by pressing a metal plate from one side to the other side, and as shown in the enlarged view of FIG. 8, the side surface of each of the first beads 241 may include an inclined surface formed depending on a jig shape.

Each of the first beads 241 according to this embodiment may extend in the second direction D2 in the same manner as in the first substrate 221, and the first beads 241 may be spaced apart from each other in the first direction D1. A substrate seating unit 243 on which the first substrate 221 is seated may be formed between the first beads 241. The first bead 241 need not necessarily be arranged in a continuous form, and may be partially formed.

Referring to FIG. 8, the first beads 241 may not extend to a region area (left side) where the second substrate 222 is located, and the first beads 241 may be omitted. The first beads 241 may be formed only at the positions where the fastening holes 244 and the fixing holes 245 for coupling the diffuser plate supporters 270 are formed.

Figure 9:
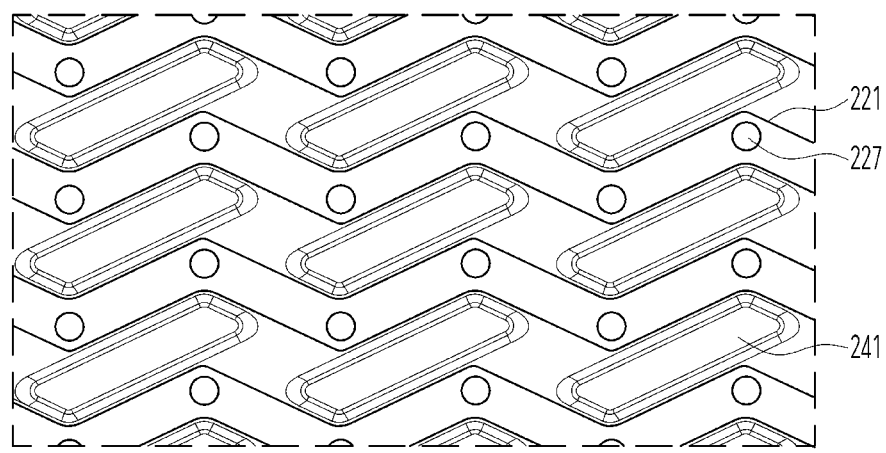
FIG. 9 is an exploded perspective view illustrating the backlight unit according to an embodiment of the present disclosure.

FIG. 9 is a plan view illustrating the rear plate 240 of the backlight unit (BLU) according to another embodiment of the present disclosure. As an example of the rear plate 240 located on the rear surface of the backlight substrate 220 including the zigzag-shaped first substrate 221, the substrate seating units 243 may be located corresponding to the shape of the backlight substrate 220, and the first beads 241 may be placed between the substrate seating units 243.

As shown in the embodiment of FIG. 8, it is easy to form continuous first beads 241 in a straight shape, but in this embodiment of FIG. 9, it is difficult to form the first beads 241 in a zigzag shape so that a plurality of discontinuous (or broken) first beads 241 arranged in only one direction may be formed.

Figure 10:
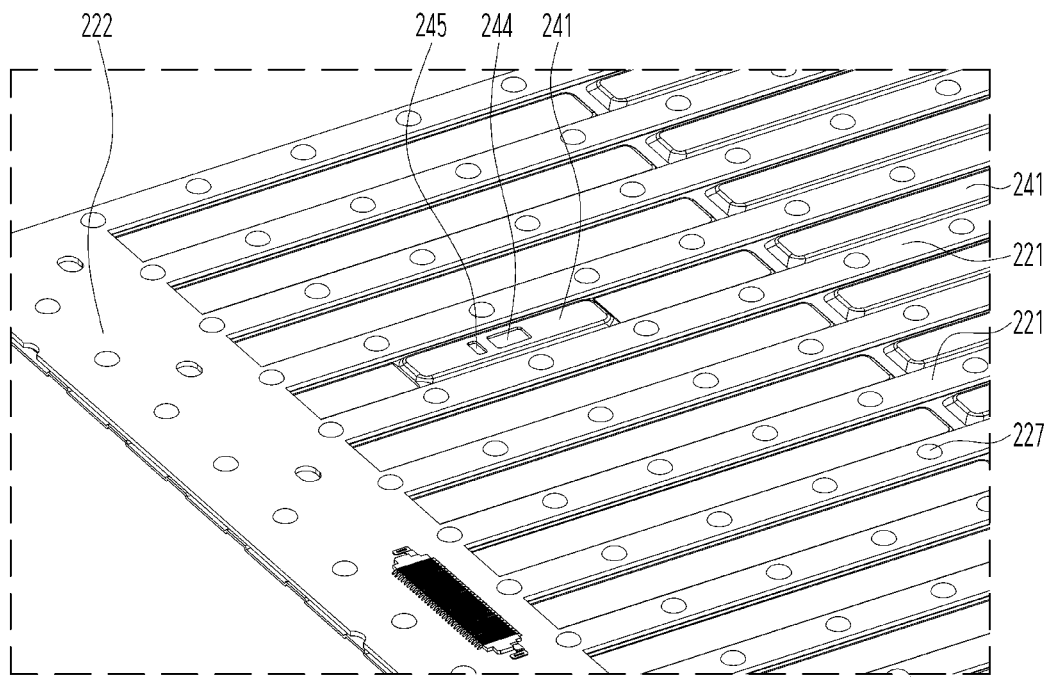
FIG. 10 is a partially enlarged view illustrating the backlight unit according to an embodiment of the present disclosure.

FIG. 10 is an enlarged view illustrating the backlight substrate 220 seated on the rear plate 240. Referring to FIG. 10, the first beads 241 may be located between the first substrates 221, and a space between the first substrates 221 may have the same height as the substrate seating unit 243.

The end portion 221b (see FIG. 11) of the first substrate 221 in the first direction D1 may have a protruding structure (not shown) due to a burr generated when fabricating the backlight substrate 220. A separation space may be formed between the rear plate 240 and the backlight substrate 220 due to the burr protruding from the rear surface of the backlight substrate 220.

A second bead 242 protruding in the rear direction may be further included between the first bead 241 and the substrate seating unit 243 to provide a space in which the burr is to be placed. Referring to the right enlarged perspective view of FIG. 8, the first beads 241, the second beads 242, the substrate seating units 243 may be arranged in the first direction D1 in the same order as that of the second beads 242.

Figure 11:
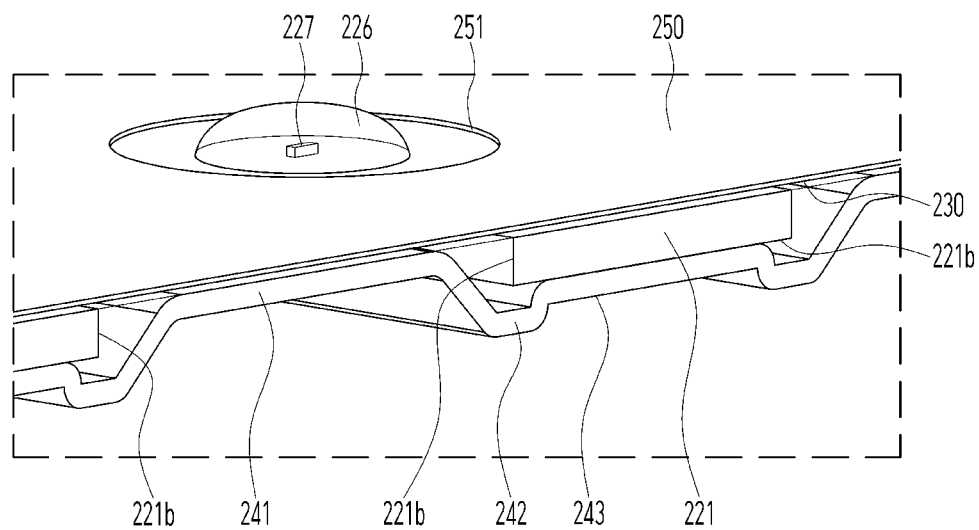
FIG. 11 is a plan view illustrating a rear plate of a backlight unit according to another embodiment of the present disclosure.

FIG. 11 is a partially enlarged view illustrating the backlight unit (BLU) according to an embodiment of the present disclosure. As shown in FIG. 10, after the backlight substrate 220 is placed on the rear plate 240, the adhesive tape and the reflector 250 can be combined on the front surface.

Referring to FIG. 11, the reflector 250 and the backlight substrate 220 may be coupled to each other through the adhesive tape 230, and the first beads 241 of the rear plate 240 may also be coupled to the reflector 250 through the adhesive tape 230. A height difference between the substrate seating unit 243 and the first beads 241 may be formed to correspond to the thickness of the backlight substrate 220, and the first beads 241 of the rear plate 240 and the backlight substrate 220 may be attached to the reflector 250 through the adhesive tape 230.

Figure 12:
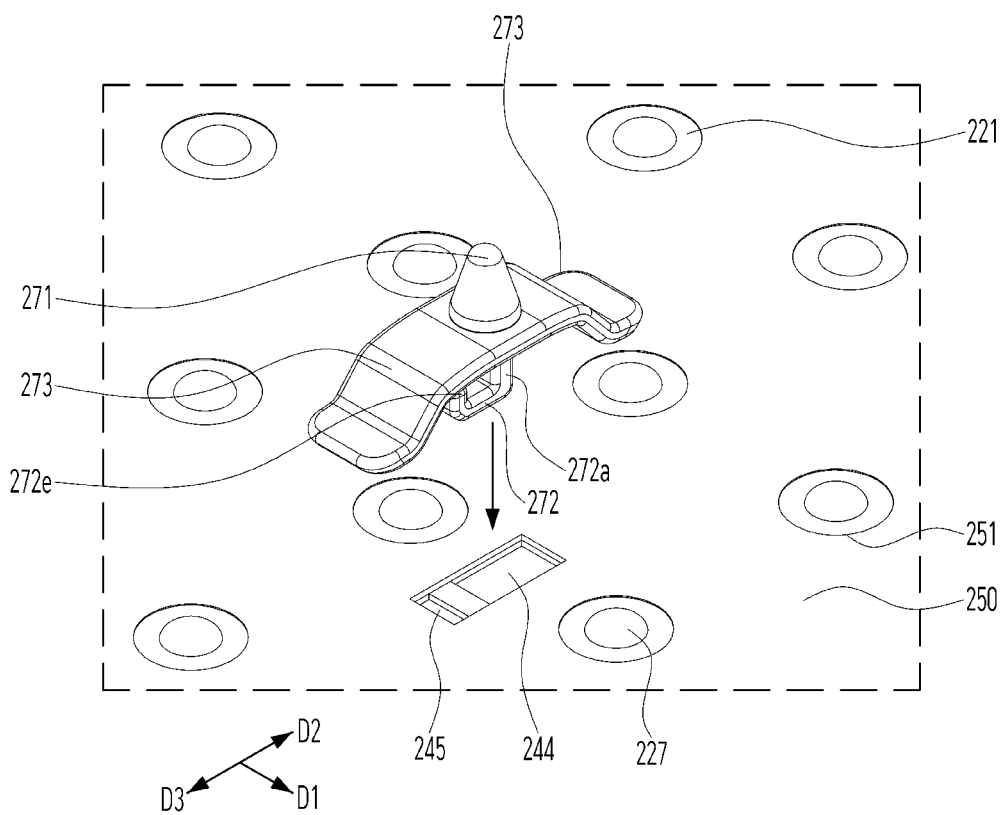
FIGS. 12 and 13 are diagrams illustrating a method of assembling a diffuser plate supporter according to the present disclosure.
Figure 13:
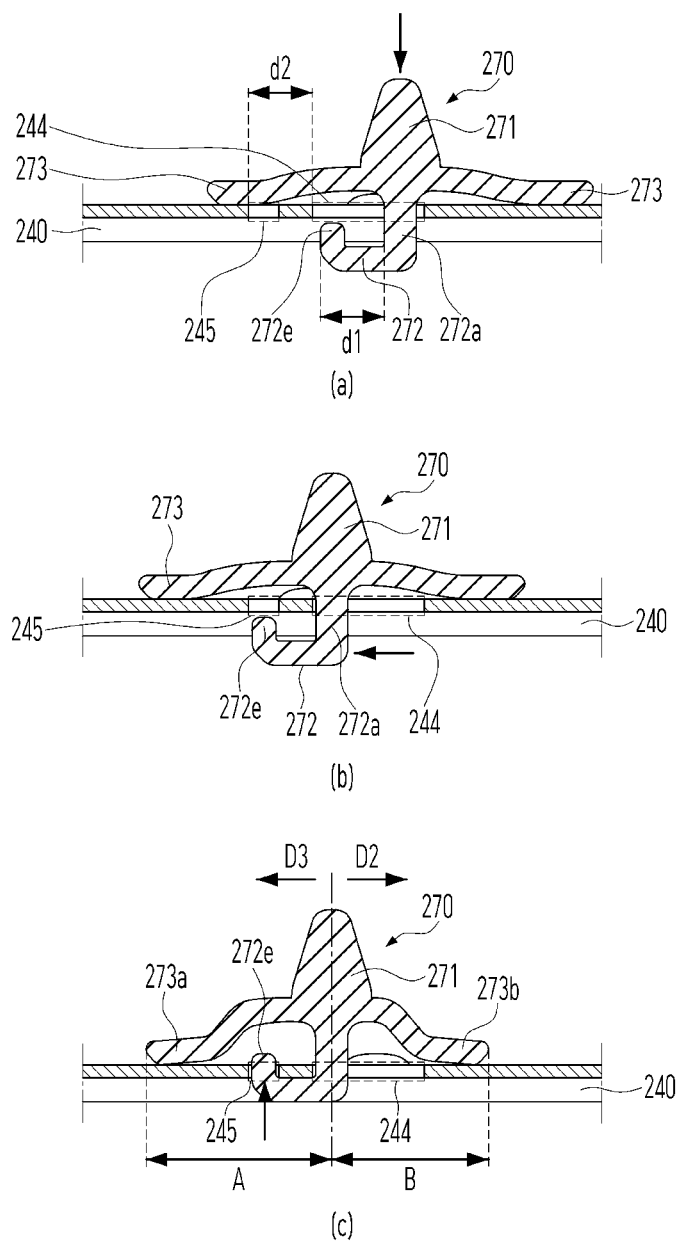

FIGS. 12 and 13 are diagrams illustrating a method of assembling the diffuser plate supporter 270. The diffuser plate supporter 270 according to the present disclosure may be inserted into the fastening hole 244 of the rear plate 240 after the reflector 250, the backlight substrate 220, and the rear plate 240 are coupled to each other.

In addition to the light source holes 251 exposing the LEDs 227, the reflector 250 may further include the fastening holes 244 of the rear plate 240 and the support holes 252 exposing the fixing holes 245. Each of the support holes 252 of the reflector 250 may be formed small to expose only the fastening hole 244 and the fixing hole 245 in order to minimize the size of the support hole 252, as shown in FIG. 12. The adhesive tape 230 may also include a supporter hole 232, and the supporter hole 232 of the adhesive tape 230 may be formed larger than the supporter hole 252 of the reflector 250.

The diffuser plate supporter 270 may include a support protrusion 271 formed to contact the lower surface of the optical sheet layer 260, and a supporter hook 272 through which the rear plate 240 is inserted into the fastening hole 244. After the supporter hook 272 extends downward, a hook end 272e may be bent upward, and the hook end 272e may extend in the second direction D2 or the third direction D3 opposite to the second direction D2.

The supporter hook 273 of the diffuser plate supporter 270 may extend in the third direction D3, as shown in FIG. 12. The plurality of diffuser plate supporters 270 may be arranged so that the directions of the supporter hooks 272 are opposite to each other. In order to minimize the structure protruding toward the back surface of the rear plate 240, the lower end of the hook may have a flat surface. The fastening hole 244 may have a size greater than or equal to the width of the supporter hook 272 in the second direction D2, and the supporter hook 272 may be inserted into the fastening hole 244.

An elastic portion 273 extending in the second direction D2 and the third direction D3 may be disposed between the supporter hook 272 and the support protrusion 271. The end of the elastic portion 273 may be bent in the rear direction, and the end of the elastic portion 273 may be in contact with the front surface of the reflector 250. One pair of the elastic portions 273 may be provided such that two elastic portions 273 extend in opposite directions of the support protrusion 271.

When the support protrusion 271 is pressed in the rear direction, the elastic portion 273 may be deformed. Then, when the support protrusion 271 is pressed in the rear direction and the pressing force is then removed, the support protrusion 271 can be restored to the original position thereof again. The elastic portion 273 may be configured to deform the support protrusion 271 according to external force, so that the optical sheet layer 260 contacting the end of the support protrusion 271 may be prevented from being damaged by the support protrusion 271.

As shown in FIG. 13(a), the supporter hook 272 may be inserted into the fastening hole 244, and the hook end 272e may penetrate the fastening hole 244 to press the support protrusion 271 in the rear direction, and may thus remain located on the back surface of the rear plate 240.

Thereafter, as shown in FIG. 13(b), the end of the supporter hook 272 may be pushed in the third direction D3 along which the support hook 252 is formed until the end of the supporter hook 272 is located on the rear surface of the fixing hole 245 located in the third direction D3 of the fastening hole 244. Then, when the force pressing the support protrusion 262 is removed, the support protrusion 271 may protrude in the front direction (upper side in the drawing) due to elasticity of the elastic portion 273, and the hook end 272e may be inserted into the fixing hole 245.

A distance (d2) between the end portion of the fastening hole (244) in the third direction D3 and the end portion of the fixing hole 245 in the third direction D3 may be determined to correspond to the distance (d1) between the hook end 272e and the extension portion 272a located below the support protrusion 271 of the support hook 272.

The fixing hole 245 may have a size corresponding to the size of the hook end 272e of the supporter hook 272 so that the hook end 272e of the supporter hook 272 can be inserted and fixed, and may have a relatively small size compared to the fastening hole 244.

The supporter hook 272 may be fastened to the rear plate 240. The elastic portion 273 may be in contact with the front surface of the reflector 250, and may serve to fasten the reflector 250 and the rear plate 240.

The direction in which the diffuser plate supporter 270 receives force may vary depending on the direction in which the hook end 272e of the supporter hook 272 extends. In a situation where the supporter hook 272 is bent in the third direction, when the support protrusion 271 of the diffuser plate supporter 270 is pressed from the upper side, the support hook 272 may be tilted in the second direction D2. In order to reinforce the rigidity in the second direction D2, the length (b) of the elastic portion 273b in the second direction may be shorter than the length (a) of the elastic portion 273a in the third direction D3 (i.e., a>b).

The backlight substrate 220 according to the present disclosure may reduce production costs of the constituent components by reducing the area of the substrate by half, and may be opened in the forward and backward directions, so that heat generated from the light source can be easily dissipated.

The backlight unit (BLU) according to the present disclosure can reduce production costs and at the same time secure rigidity.

In addition, convenience of the assembly process can be improved due to holes formed to facilitate coupling to the bottom cover.

As is apparent from the above description, the backlight unit according to the embodiments of the present disclosure can reduce production costs and at the same time secure rigidity.

The above detailed description should not be construed as being limitative in all terms, but should be considered as being illustrative. The scope of the present disclosure should be determined by reasonable analysis of the accompanying claims, and all changes in the equivalent range of the present disclosure are included in the scope of the present disclosure.

What is claimed is:

1. A backlight unit comprising:
a backlight substrate including a plurality of first substrates that are spaced apart from each other by a predetermined distance in a first direction and extends in a second direction perpendicular to the first direction, and a second substrate through which the plurality of first substrates are connected to each other;
a plurality of light emitting diodes (LEDs) arranged at predetermined intervals on a front surface of the backlight substrate;
a rear plate including a substrate seating unit on which a rear surface of the backlight substrate is seated, and at least one first bead that protrudes forward while being disposed between the first substrates;
a reflector disposed on the front surface of the backlight substrate; and
an adhesive tape disposed between the backlight substrate and the reflector and configured to attach the backlight substrate and the at least one first bead of the rear plate to the reflector,
wherein the rear plate includes a second bead disposed between the substrate seating unit and the at least one first bead, and configured to protrude farther backward than the substrate seating unit.

2. The backlight unit according to claim 1, wherein:
each of the adhesive tape and the reflector includes at least one light source hole formed at a position corresponding to one of the plurality of LEDs.

3. The backlight unit according to claim 1, wherein:
a height difference between the at least one first bead and the substrate seating unit of the rear plate corresponds to a height of the backlight substrate.

4. The backlight unit according to claim 1, wherein:
a spacing between each of the first substrates corresponds to a length of the first substrates in the first direction; and
the second substrate is located at one end of the first substrates in the second direction.

5. The backlight unit according to claim 1, wherein:
a diffuser plate supporter disposed between the first substrates and fastened to the rear plate.

6. The backlight unit according to claim 5, wherein:
the diffuser plate supporter is coupled to a fastening hole formed in the at least one first bead.

7. The backlight unit according to claim 6, wherein the diffuser plate supporter includes:
a support protrusion formed to protrude forward;
a supporter hook formed to extend toward a rear surface of the support protrusion and inserted into the fastening hole of the at least one first bead; and
an elastic portion formed to extend in a lateral direction of the support protrusion so that an end portion of the elastic portion is in contact with a top surface of the reflector.

8. The backlight unit according to claim 7, wherein:
the supporter hook includes an end portion that is bent toward one side from among the second direction and a third direction opposite to the second direction; and
the rear plate includes a fixing hole that is adjacent to the fastening hole and into which the end portion of the supporter hook is inserted.

9. The backlight unit according to claim 8, wherein:
the elastic portion includes one pair of elastic portions in which one elastic portion extends from the support protrusion in the second direction and an other elastic portion extends from the support protrusion in the third direction; and a length of the elastic portion in one direction in which the end portion of the supporter hook is bent is longer than a length of the elastic portion in an opposite direction of the one direction.

10. The backlight unit according to claim 6, wherein:

each of the adhesive tape and the reflector includes a supporter hole formed at a position corresponding to the fastening hole.

11. A display device comprising:

a liquid crystal panel;

an optical sheet layer disposed on a rear surface of the liquid crystal panel; and a backlight unit disposed on a rear surface of the optical sheet layer, wherein the backlight unit includes:

a backlight substrate including a plurality of first substrates that are spaced apart from each other by a predetermined distance in a first direction and extends in a second direction perpendicular to the first direction, and a second substrate through which the plurality of first substrates are connected to each other;

a plurality of light emitting diodes (LEDs) disposed at predetermined intervals on respective front surfaces of the first substrates and the second substrate;

a rear plate including a substrate seating unit on which a rear surface of the backlight substrate is seated, and at least one first bead that protrudes forward while being disposed between the first substrates;

a reflector disposed on a front surface of the backlight substrate; and an adhesive tape disposed between the backlight substrate and the reflector and configured to attach the backlight substrate and the at least one first bead of the rear plate to the reflector, wherein the rear plate includes a second bead disposed between the substrate seating unit and the at least one first bead, and configured to protrude farther backward than the substrate seating unit.

12. The display device according to claim 11, wherein:

a height difference between the at least one first bead and the substrate seating unit of the rear plate corresponds to a height of the backlight substrate.

13. The display device according to claim 11, further comprising:

a diffuser plate supporter disposed between the first substrates and fastened to a fastening hole formed in the at least one first bead of the rear plate.

14. The display device according to claim 13, wherein the diffuser plate supporter includes:

a support protrusion formed to protrude forward;

a supporter hook formed to extend toward a rear surface of the support protrusion and inserted into the fastening hole of the at least one first bead; and an elastic portion formed to extend in a lateral direction of the support protrusion so that an end portion of the elastic portion is in contact with a top surface of the reflector.

* * * * *